3,819,658
ISOMERIZATION OF TETRAHYDROPHTHALIC
ANHYDRIDE
William T. Gormley, Pittsburgh, Pa., and Ben B. Corson,
Milwaukee, Wis., assignors to Koppers Company, Inc.
No Drawing. Filed Mar. 10, 1971, Ser. No. 123,076
Int. Cl. C07c 61/24
U.S. Cl. 260—346.3      13 Claims

ABSTRACT OF THE DISCLOSURE

Tetrahydrophthalic anhydride is isomerized in the presence of a catalytic amount of rhodium.

FIELD OF THE INVENTION

This invention relates to the catalytic isomerization of tetrahydrophthalic anhydride.

Tetrahydrophthalic anhydride has 4 isomers with respect to the position of the double bond. They are:

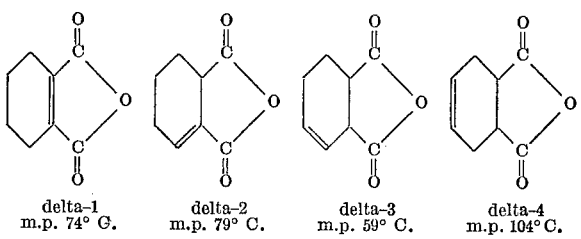

delta–1        delta–2        delta–3        delta–4
m.p. 74° C.    m.p. 79° C.    m.p. 59° C.    m.p. 104° C.

The most readily available isomer is delta-4 tetrahydrophthalic anhydride, referred to also as 4-cyclohexene-1,2-dicarboxylic anhydride. The delta-4 isomer, which is available commercially, is made economically by reacting maleic anhydride and 1,3-butadiene. This reaction, which can produce the delta-4 isomer in substantially quantitative yields, does not produce the delta-1, delta-2 or delta-3 isomers of tetrahydrophthalic anhydride.

Delta-4 tetrahydrophthalic anhydride has a number of important uses. For example, it can be used as a substitute for phthalic anhydride in the preparation of alkyd resins; it can be used as a curing agent for epoxy resins; and monohydric esters of this anhydride can be used as plasticizing and softening agents for rubber.

However, there are some applications in which the other isomers of tetrahydrophthalic anhydride can be used to better advantage than the delta-4 isomer. For example, it has been reported that tetrazaporphin pigments of a red tone can be prepared by combining delta-1 tetrahydrophthalic anhydride with a metal such as nickel.

It has been recognized also that mixtures of the aforementioned isomers which mixtures are liquid at room temperature can be used to better advantage in some applications than the solid delta-4 isomer. (From the melting point data reported below the structural formulas set forth hereinabove, it can be seen that each of the isomers is a solid at room temperature. However, there can be prepared isomeric mixtures which have melting points lower than the lowest melting point isomer present in the mixture; and isomeric mixtures which are in the liquid state at room temperature are known.) For example, the use of a liquid mixture of tetrahydrophthalic anhydride isomers as an epoxy resin hardener has advantages over the use of a solid anhydride. Also, for isomeric mixtures which are solids at room temperature, the general rule is that the lower their freezing points, the more advantageous their use as epoxy resin hardeners. This is because the pot life of the epoxy resin/anhydride mixture is longer, the lower the freezing point of the anhydride and best results are obtained when the anhydride is in the liquid state at room temperature. The longer pot life provides very important material handling advantages.

One aspect of this invention relates to the production of a mixture of isomers of tetrahydrophthalic anhydride which mixture contains a major amount of an isomer other than the delta-4 isomer; another aspect relates to the production of an isomeric mixture which is in the liquid state at temperatures in the range of room temperature or which has a melting or freezing point below that of the isomer in the mixture with the lowest freezing or melting point.

REPORTED DEVELOPMENTS

Methods for isomerizing delta-4 tetrahydrophthalic anhydride by the use of a catalyst have been disclosed. They have one or more disadvantages as will be discussed below.

U.S. Pat. No. 2,764,597 discloses the isomerization of delta-4 tetrahydrophthalic anhydride in the presence of a palladium or ruthenium catalyst. The patent discloses yields of 40% to 75% of the delta-1 isomer. The conditions under which the isomerization reaction are run to produce the delta-1 isomer are relatively severe. As can be seen from the examples of this patent, relatively long reaction times and high temperatures are used to produce the delta-1 isomer, and even then, the yield of the delta-1 isomer is relatively low. (Example 2 shows a reaction temperature of 170°–175° for 16 hrs. and a yield of 75% of the delta-1 isomer; Example 1 shows about the same reaction temperature and a time of 6 hrs., but a yield of only 60%.)

U.S. Pat. No. 2,959,599 discloses the catalytic isomerization of delta-4 tetrahydrophthalic anhydride to isomeric liquid mixtures by utilizing one of the following catalysts: sulfuric acid, phosphoric acid, and acid halides, acid salts and anhydrides of said acids. This method produces acidic coke by-products. A separation step, such as filtering, must be employed to remove the by-product from the reaction product. Furthermore, it has been found that they are difficult to remove from the reactor. In addition, acid contaminates must be removed from the reaction product.

BRIEF DESCRIPTION OF THE INVENTION

In accordance with this invention, it has been found that rhodium is an effective catalyst for producing isomers of a tetrahydrophthalic anhydride. As will be discussed more fully hereinbelow, isomeric mixtures containing different amounts of isomers can be produced by varying the catalytic reaction conditions. For example, an isomeric mixture containing in excess of 80 wt. percent of the delta-1 isomer can be produced in accordance with this invention; or the reaction conditions can be selected so that there are produced isomeric mixtures which are in the liquid state at room temperature.

The rhodium catalyst can be used to isomerize also derivatives of tetrahydrophthalic anhydride, including, for example, esters thereof and lower alkyl derivatives.

The temperature at which the isomerization reaction is carried out can vary over a wide range for example, about 80° C. to about 250° C.

The proportion of rhodium catalyst used in the isomerization reaction can vary over a wide range also. For example, rhodium can comprise about 0.001% to about 10% by weight of the material to be isomerized.

The isomerization utilizing the rhodium catalyst can be carried out in batch or continuous operations. In addition, an integrated process in which the starting materials used are the reactants which form the material to be isomerized can be carried out in accordance with the present invention.

The finding that rhodium is effective in isomerizing delta-4 tetrahydrophthalic anhydride is contrary to heretofore reported developments. The aforementioned Pat. No. 2,764,597 contains an explicit statement that rhodium is ineffective as an isomerization catalyst (column 2, lines 21–29).

The use of rhodium as an isomerization catalyst for producing isomers of tetrahydrophthalic anhydride provides a number of advantages over heretofore available catalysts. Two very important advantages are that isomeric mixtures in the liquid state can be produced very rapidly at moderate temperatures, for example, within 1–2 hours @ 150° C., and isomeric mixtures containing a very high proportion of the delta-1 isomer can be produced within relatively short periods of time at relatively low temperatures compared to heretofore known processes. Isomeric mixtures containing in excess of 80 wt. percent of the delta-1 isomer have been produced within 5 hours at 190° C. Another advantage is extremely small amounts of the rhodium catalyst can be utilized—for example, about 1 part of rhodium to 100,000 parts of material to be isomerized. In addition, it has been observed that rhodium has a low rate of attrition and a relatively long activity period. The rhodium catalyst can be regenerated and reused for extended periods of time. Furthermore, substantially 100% yields of isomerized product can be obtained.

DETAILED DESCRIPTION OF THE INVENTION

It is believed that the present invention will have its widest use in applications in which rhodium is used as a catalyst to isomerize delta-4 tetrahydrophthalic anhydride, which as mentioned above, is readily available as a result of its being able to be produced economically by reacting 1,3-butadiene and maleic anhydride. However, tetrahydrophthalic anhydrides other than the delta-4 isomer can be isomerized also in the presence of rhodium. For example, lower alkyl (1 to about 6 carbon atoms) and polyalkyl substituted tetrahydrophthalic anhydrides can be isomerized utilizing the rhodium catalyst. Such derivatives of tetrahydrophthalic anhydride can be prepared by reacting maleic anhydride with isoprene, piperlyene or hexadiene. In addition, the rhodium catalyst can be used effectively to change the proportion of isomers present in a mixture made up of different isomers of tetrahydrophthalic anhydride. Still another example of starting material that can be used is an ester of tetrahydrophthalic anhydride including mono- and di-alkyl esters. The alkyl groups of such esters can have 1 to about 10 carbon atoms; examples of such groups include methyl, propyl, butyl and octyl groups.

The weight proportion of rhodium catalyst to material to be isomerized can vary over a wide range, for example about 1:100,000 to about 1:10 (about 0.001% to about 10%). At ratios of greater than 1:10, disproportionation may be encountered; and below 1:100,000, the amount of catalyst may be so small as to be ineffective.

The rhodium catalyst may be supported or unsupported; preferably it is supported. Examples of supporting materials are alumina, ($Al_2O_3$), carbon, silica gel and kieselguhr. The use of rhodium supported on alumina ($Rh$—$Al_2O_3$) is favored because it is a relatively dense material which settles readily from the liquid reaction mixture. Thus, the reaction product can be separated easily from the catalyst by decanting.

The weight proportion of catalyst to support material is not critical and may vary over a wide range. There can be used commercially available catalytic support materials which contain about 0.5% to about 20% by weight of active rhodium. It should be understood that the support material can comprise higher or lower proportions of the catalyst. Alumina and carbon support materials having about 0.5% to about 5% by weight of rhodium have been used very effectively.

The isomerization can be carried out at a temperature within the range of about 80° C. to about 250° C. Temperatures above about 250° C. can lead to disproportionation, cracking and reduced catalyst life. At temperatures below about 80° C., the reaction proceeds at a very slow rate. When it is desired to produce a liquid isomeric mixture, it is suggested that a temperature within the range of about 125° C. to about 235° C. be used. The production of an isomeric mixture having a major proportion of the delta-1 isomer is preferably carried out at a temperature within the range of about 170° C. to about 250° C.

The isomerization is carried out in the liquid state and is best accompanied by stirring to maintain the rhodium catalyst in intimate contact with the isomerizable material. When a reaction temperature below the freezing point of the starting material is used, for example below about 104° C. in the case of the delta-4 isomer, the starting material can be dissolved in a suitable solvent. Examples of solvents that can be used are ethyl acetate, butyl butyrate and dibutyl ether.

When it is desired to recover the delta-1 isomer or other "non-delta-4" isomer from the reaction product, it will be most practical to produce an isomeric mixture that has at least about 65 wt. percent of the desired isomer. The rhodium catalyst of this invention has been used effectively to produce isomeric mixtures that contain as high as about 80 to 85% by weight of the delta-1 isomer and about 80 to 85% by weight of the delta-3 isomer. Experience with the rhodium catalyst under many different reaction conditions has shown that the delta-2 isomer content of the reaction mixture is usually much smaller—for example about 20% by weight. The desired isomer can be separated from the reaction mixture by crystallization from a solvent such, for example, ether and aromatic hydrocarbons such as xylene and toluene.

As mentioned above, the isomerization can be carried out in a batch, a continuous or an integrated operation.

In a typical batch operation, the rhodium catalyst, preferably on an alumina support, is mixed with the isomerizable material in the liquid phase. The mixture is maintained at the desired temperature and stirred throughout the reaction cycle to maintain contact between the rhodium and the isomerizable material.

In a typical continuous operation, the material to be isomerized is passed in the liquid state through a catalyst bed heated to the desired operating temperature. The weight hourly space velocity (WHSV) that is, the hourly rate of production per weight unit of catalyst, can be varied over a relatively wide range. By way of example, it is noted that there have been used effectively WHSV's in the range of about 0.4 to about 6.0.

In an integrated operation, the reactants used to form the isomerizable material can be brought together in the presence of the rhodium catalyts or rhodium can be added after the isomerizable material has been formed. A preferred mode of operating an integrated process for preparing and isomerizing the delta-4 isomer is as follows. Into a reactor containing a stirred mixture of a rhodium/alumina catalyst and molten maleic anhydride, there is passed gaseous 1,3-butadiene in excess of the stoichiometric amount required to react with the maleic anhydride. The reaction temperature can be maintained between about 100° C. and about 250° C. The passage of the butadiene can be terminated when the butadiene take-up stops. The presence of the rhodium catalyst does not interfere with the formation of delta-4 tetrahydrophthalic anhydride, but the presence of the butadiene and, to a lesser extent, maleic anhydride deactivates the rhodium catalyst. Nitrogen or another suitable inert gas can be used to purge the reactor of the butadiene after passage thereof has been terminated. If the catalyst has been deactivated significantly, it can be treated with a small amount of hydrogen to convert the butadiene to innocuous butane. Isomerization of the delta-4 isomer can then be effected by the rhodium catalyst.

Alternatively, the catalyst may be added to the reactor after the reactants have formed the delta-4 isomer. Or the delta-4 isomer may be transferred to a reactor containing the isomerization catalyst after which the mixture is heated and stirred to produce the desired product. The operation can be carried out efficiently on a continuous basis by flowing the butadiene-free delta-4 tetrahydrophthalic anhydride down through a catalyst bed. The butadiene can be removed by injecting a purge stream of inert gas, typically nitrogen, and the residual butadiene can be converted to butane by passing a small amount of diluted hydrogen up through the catalyst bed.

It is difficult and impractical to state the reaction conditions which will be effective in producing a particular type of reaction product—for example, one having a relatively high delta-1 isomer content or an isomeric mixture which is in the liquid state at room temperature. The difficulty arises because there are inherent in the isomerization reaction numerous variables, such as the starting material, the proportion of catalyst to material to be isomerized, the reaction temperature, the time of reaction, etc. A change in any one of the variables can change the proportions of isomers which comprise the reaction product. It is suggested that a small sample of the starting material be isomerized under a set of reaction conditions and that the product be analyzed after which changes can be made in one or more of the reaction variables until the desired product is produced. The numerous examples reported below can be used as guidelines for selecting suitable reaction conditions.

Notwithstanding the difficulties that are encountered in correlating the reaction variables with the composition of the reaction product, some comments of a general nature can be made on the basis of experience as to the type of product that can be produced under certain conditions. For example, liquid isomeric mixtures can be produced in a relatively short period of time at moderate reaction temperatures. To illustrate, there has been produced a liquid isomeric mixture containing 15% delta-4 isomer, 82% delta-3 isomer and 3% delta-1 isomer at a reaction temperature of 150° C. and a reaction time of 1 to 2 hrs. On the other hand, it has been found that longer reaction times and higher temperatures are needed to produce an isomeric mixture containing major proportion of the delta-1 isomer. To illustrate, after 4 hours of reaction at 200° C. there was produced an isomeric mixture containing 73% of the delta-1 isomer. It has been observed also that after repeated use of the catalyst without regeneration, the amount of delta-3 isomer (the isomer with lowest melting point) begins to increase as the amount of delta-1 isomer begins to decrease. If desired, production can be programmed to produce in initial runs isomeric mixtures with high dela-1 content and in latter runs mixtures having a high delta-3 content.

Isomeric mixtures produced by utilizing the rhodium catalyst of this invention can be hydrogenated easily and readily by leaching the rhodium isomerization catalyst in the isomeric mixture where it will function to catalyze the hydrogenation as hydrogen is passed through the mixture. By partially hydrogenating the isomeric mixture, an epoxy curing agent containing both hexahydro- and tetrahydro-phthalic anhydrides can be produced and each of the anhydrides will impart its peculiar properties to the cured epoxy product. Another advantage of partially hydrogenating the isomeric mixture is that the introduction into the mixture of hexahydrophthalic anhydride with its relatively low freezing point (35° C.–37° C.) will produce a product that has a lower freezing point than the starting isomeric mixture.

The hydrogenation can be carried out according to known methods and to any desired extent. It has been found advantageous to fortify the isomeric mixture with delta-4 isomer prior to hydrogenation. The fortification makes it possible to increase considerably the delta-4 isomer throughput. The extent to which the mixture is hydrogenated can be varied as desired. It is believed that a mixture which contains hexahydrophthalic anhydride along with one or more isomers of tetrahydrophthalic anhydride will have its widest use as a curing agent for epoxy resins.

Examples set forth below are illustrative of the present invention. Unless otherwise stated, the apparatus used in the reactions described in the examples consisted of a 3-necked round bottom flask equipped with a stirrer, thermometer, reflux condenser and gas inlet and outlet connections. The flask was heated by a Glas Col mantle. (As a safety measure, the reaction can be carried out under a blanket of $N_2$ due to the pyrophoric nature of the catalyst.) The yields of isomers were substantially 100%. The abbreviation "THPAA" used extensively hereafter means tetrahydrophthalic anhydride. The symbol "%" means percent by weight based on the total weight of the composition.

The first four examples illustrate a batch process for isomerizing delta-4 tetrahydrophthalic anhydride to isomeric mixtures containing relatively high amounts of the delta-1 isomer. The rhodium catalyst was supported on carbon.

Example 1

One hundred grams of delta-4 tetrahydrophthalic anhydride and 3 grams of a 5% Rh–95% carbon catalyst were charged to the reaction flask. The isomerization reaction was allowed to proceed for 5 hours at a temperature of 190° C. with stirring. The catalyst was separated from the reaction product by suction filtering through a sintered glass disc. Analysis of the reaction product, a light amber solid, by infrared showed that it contained 83% of the delta-1 isomer.

Example 2

The same procedure as described in Example 1 was followed except that the reaction was run for 7 hours instead of 5 hours. The delta-1 isomer content of the reaction product was 76%.

Example 3

The same procedure as described in Example 1 was followed except that the reaction was run for 4 hours at a temperature of 200° C. The delta-1 isomer content of the reaction product was 73%.

Example 4

The same procedure as described in Example 3 was followed except that the reaction was run for 6 hours instead of 4 hours. The delta-1 isomer content of the reaction product was 78%.

The next four examples show the preparation of liquid isomeric mixtures by a batch process. The rhodium catalyst was supported on alumina.

Example 5

The same procedure as in Example 1 was followed except that the catalyst used was 5% Rh–95% alumina and the reaction was carried out for 1 hour at 170° C. Analysis of reaction product by infrared showed 10% delta-1 isomer, 62% delta-3 isomer and 28% delta-4 isomer. At 25° C. the isomeric mixture was a pale amber, thin slush.

Example 6

The same procedure as described in Example 5 was followed except that the reaction was allowed to proceed for 2 hours instead of 1 hour. Analysis of the reaction product showed 18% delta-1, 64% delta-3 and 18% delta-4. At 25° C. the isomeric mixture was a clear, pale amber liquid.

Example 7

The same procedure as described in Example 5 was followed except that the reaction was carried out for 3 hours at a temperature of 150° C. Analysis of the reaction product showed 10% delta-1, 73% delta-3, and 17% delta-4. At 25° C. the isomeric mixture was a clear, pale amber liquid.

Example 8

The same procedure as described in Example 7 was followed except that the reaction was allowed to proceed for 4 hours instead of 3 hours. Analysis of the reaction product showed 15% delta-1, 67% delta-3 and 18% delta-4. At 25° C. the isomeric mixture was a clear, pale amber liquid.

Example 9 below is illustrative of an integrated batch process for isomerizing delta-4-tetrahydrophthalic anhydride by adding the rhodium catalyst to the reaction vessel after the preparation of the delta-4 THPAA.

Example 9

Delta-4 tetrahydrophthalic anhydride was prepared by passing butadiene over a mixture of 98 g. (1 mole) of maleic anhydride and 15 g. of tetrahydrophthalic anhydride isomer mixture at 100° C. until butadiene absorption ceased (3 hrs.). Excess butadiene was removed by passing a stream of nitrogen through the stirred mixture for 2 hrs. Then 0.5 g. of 5% Rh–95% $Al_2O_3$ catalyst was added and the stirred delta-4 THPAA was isomerized with heating at 150° C. for 5 hrs. Finally the liquid product was decanted from the catalyst. Analysis of the liquid product showed the isomer content to be 14% delta-1, 3% delta-2, 68% delta-3, 15% delta-4. The freezing point of the liquid product was less than 25° C.

Examples 10 and 11 below are illustrative of an integrated batch process for isomerizing delta-4 tetrahydrophthalic anhydride by preparing the delta-4 THPAA in the presence of the rhodium isomerization catalyst.

Example 10

Delta-4 tetrahydrophthalic anhydride was prepared by passing butadiene over a slurry of 98 g. (1 mole) of maleic anhydride and the catalyst heel from Example 1 at 110° C. until butadiene absorption ceased (3 hrs.). Nitrogen was then passed through the stirred liquid mixture at 110° C. for 2 hrs. The liquid mixture was stirred at 150° C. for 5 hours, but an analysis of a sample portion showed no isomerization. This was attributed to deactivation of the catalyst by the residual butadiene. The catalyst was activated by passing two liters of hydrogen through the reaction slurry containing the delta-4 isomer for 2 hrs. at 110° C. The slurry was then stirred for 5 hrs. at 150° C. A liquid mixture of isomers containing 23% of delta-1, 8% of delta-2, 57% of delta-3 and 12% of delta-4 was produced. The freezing point of the resulting mixture was less than 25° C.

Example 11

Delta-4 tetrahydrophthalic anhydride was prepared by passing butadiene over a stirred slurry of 98 g. (1 mole) of maleic anhydride, 225 ml. of toluene and 2.2 g. of 5% Rh–95% $Al_2O_3$ catalyst at 100° C. until butadiene absorption ceased (4.5 hr.). (The presence of the toluene solvent facilitates separation of the reaction product from the catalyst.) Excess butadiene was removed by passing nitrogen over the stirred slurry for 2 hrs. Thereafter, the mixture was stirred at 100° C. for 7 hrs. The resulting solution was decanted from the catalyst, concentrated, and the concentrate degassed at 50° C./2 mm. Infrared examination of the liquid residue showed its isomer composition to be 3% of delta-1, 5% of delta-2, 78% of delta-3, and 14% of delta-4; its freezing point was less than 25° C.

Examples 12–17 below show the batch isomerization of delta-4 tetrahydrophthalic anhydride to an isomer mixture containing a very high content of the delta-1 isomer.

Examples 12–17

A stirred mixture of 600 g. of delta-4 tetrahydrophthalic anhydride and 1 g. of 5% Rh–95% $Al_2O_3$ catalyst was heated at 170° C. for 80 hours. At 6 different times during the 80 hour reaction period, the reaction product was analyzed to determine its isomer content. There are set forth in Table I below the times during which the reaction product was analyzed and the results of the analysis.

TABLE I

| Ex. No. | Total elapsed time of reaction, hrs. | Reaction time per period, hrs. | Delta-1 | Delta-2 | Delta-3 | Delta-4 |
|---|---|---|---|---|---|---|
| 12 | 9 | 9 | 22 | 0 | 46 | 32 |
| 13 | 22 | 13 | 46 | 11 | 32 | 11 |
| 14 | 37 | 15 | 67 | 17 | 15 | 1 |
| 15 | 52 | 15 | 83 | 9 | 5 | 3 |
| 16 | 66 | 14 | 83 | 11 | 4 | 2 |
| 17 | 80 | 14 | 81 | 13 | 6 | 0 |

From Table I, it can be seen that the amount of delta-1 isomer continued to increase during the first 50 hrs. or so and then leveled off at about 80%. The delta-1 isomer with a melting point of 69.5° C. to 71.5° C., and thus being essentially pure, is separated readily from the isomeric mixture by equilibrium melting and/or crystallization from benzene.

Examples 18–22 below show the batch isomerization of delta-4 tetrahydrophthalic anhydride in the presence of a relatively small amount of catalyst.

Examples 18–22

A mixture of 600 g. of delta-4 tetrahydrophthalic anhydride and 0.12 g. of 5% Rh–95% $Al_2O_3$ catalyst was stirred at 170° C. for 69 hours. At 5 periods during the 69 hrs. of heating, the reaction product was analyzed to determine its isomer content. There are set forth in Table II below the times during which the reaction product was analyzed and the results of the analysis.

TABLE II

| Ex. No. | Total elapsed time of reaction, hrs. | Reaction time per period, hrs. | Delta-1 | Delta-2 | Delta-3 | Delta-4 |
|---|---|---|---|---|---|---|
| 18 | 14 | 14 | 8 | 7 | 31 | 54 |
| 19 | 27 | 13 | 18 | 2 | 50 | 30 |
| 20 | 41 | 14 | 42 | 10 | 34 | 14 |
| 21 | 55 | 14 | 50 | 1 | 38 | 11 |
| 22 | 69 | 14 | 62 | 8 | 24 | 6 |

With reference to the Examples reported in Table II, it is noted first that the THPAA/Rhodium weight rate was 100,000/1. Thus, the weight percent of catalyst to material to be isomerized was a very small 0.001%. It is noted also that varying the time of the reaction is a means for controlling the amount of a particular isomer formed. Measurement of the freezing point of Example 20 showed that it was less than 25° C. and that of Example 22 was 44° C.

Examples 23–26 below show the use of a continuous process for isomerizing delta-4 tetrahydrophthalic anhydride to an isomeric mixture, the major portion of which is the delta-1 isomer, or to an isomeric mixture which has a freezing point below that of the isomer with the lowest freezing point (delta-3, 59° C.).

Examples 23–26

The reaction apparatus used for this continuous process was a vertical, electrically heated, stainless steel pipe equipped with appropriate microvalves and surmounted by a heated reservoir for storing molten delta-4 tetrahydrophthalic anhydride feed. The reactor was charged from the top, first with a 5 cm. layer of 3 mm. O.D. Pyrex pearls, then a 30.5 cm. bed of catalyst (100 ml. of ⅓ inch pills weighing 100 grams) and finally with a 30.5 cm. section of Pyrex pearls (preheater). The catalyst was 0.5% Rh–99.5% $Al_2O_3$. The operation consisted of flowing molten delta-4-tetrahydrophthalic anhydride from the reservoir down through the reactor at the temperatures listed in Table III below and at a rate such that the THPAA was in contact with the catalyst for the times set forth in Table III. The isomer content of the product was determined by infrared and the freezing point by the cooling curve technique. Both of these values are repeated in Table III.

TABLE III

| Example number | Reaction conditions | | Analysis of isomer content of reaction product, percent | | | | Freezing pt., °C. |
|---|---|---|---|---|---|---|---|
| | Temp., °C. | Contact time, mins. | Delta-1 | Delta-2 | Delta-3 | Delta-4 | |
| 23 | 210 | 80 | 80 | 12 | 5 | 3 | 55 |
| 24 | 210 | 40 | 60 | 4 | 18 | 18 | 39 |
| 25 | 210 | 25 | 49 | 7 | 20 | 24 | 28 |
| 26 | 230 | 15 | 32 | 5 | 24 | 39 | 46 |

Examples 27–41 below show that the rhodium catalyst resists losing activity even when used repeatedly for long periods of time. These examples show also the batch isomerization of delta-4 tetrahydrophthalic anhydride to an isomeric mixture having a relatively high delta-3 isomer content.

Examples 27–41

A mixture of 200 grams of delta-4 tetrahydrophthalic anhydride and 1 g. of 5% Ph-95% Al$_2$O$_3$ catalyst was heated at 170° C. for 5 hr. with stirring, then cooled and the liquid product was decanted from the settled catalyst. This procedure was repeated 14 additional times. The amount of delta-4 THPAA charged to the reaction vessel during each reaction is set forth in Table IV below.

TABLE IV

| Example number | Delta-4 charged, grams | Analysis of isomer content of reaction product, percent | | | | Freezing pt., °C. |
|---|---|---|---|---|---|---|
| | | Delta-1 | Delta-2 | Delta-3 | Delta-4 | |
| 27 | 200 | 26 | 1 | 47 | 26 | |
| 28 | 200 | 22 | 3 | 58 | 17 | |
| 29 | 200 | 23 | 8 | 57 | 12 | 25 |
| 30 | 200 | 29 | 13 | 50 | 8 | |
| 31 | 200 | 28 | 10 | 52 | 10 | |
| 32 | 100 | 27 | 0 | 53 | 10 | |
| 33 | 100 | 13 | 3 | 64 | 15 | 25 |
| 34 | 300 | 12 | 4 | 69 | 15 | |
| 35 | 300 | 8 | 9 | 64 | 19 | |
| 36 | 300 | 7 | 9 | 68 | 16 | |
| 37 | 200 | 13 | 7 | 67 | 13 | 25 |
| 38 | 200 | 9 | 11 | 67 | 13 | |
| 39 | 300 | 7 | 3 | 74 | 16 | |
| 40 | 200 | 7 | 3 | 75 | 15 | |
| 41 | 300 | 3 | 1 | 72 | 24 | 25 |

The next 4 examples show the partial hydrogenation of isomeric mixtures of THPAA utilizing the rhodium catalyst which served as the isomerization catalyst. The hydrogenation was carried out in a Parr hydrogenation apparatus.

Example 42

One hundred grams of delta-4 tetrahydrophthalic anhydride were heated with stirring for 1 hr. at 170° C. in the presence of 3 g. of 5% Rh–95% Al$_2$O$_3$ to give an isomeric mixture containing 28% delta-4, 62% delta-3 and 10% delta-1. The isomeric mixture was hydrogenated at 60° C. at 45–35 p.s.i.g. with 3 liters of hydrogen. The resulting liquid composition contained 30% hexahydrophthalic anhydride, 2% delta-4 THPAA, 55% delta-3 THPAA and 13% delta-1 THPAA.

Example 43

The same procedure was followed as in Example 42 except that the hydrogenation was carried out at 45–19 p.s.i.g. with 7 liters of hydrogen. The resulting liquid composition contained 58% hexahydrophthalic anhydride, 29% delta-3 and 13% delta-1.

At the end of 2 months, the hydrogenated products of Examples 42 and 43 remained pale yellow in color and liquid.

Examples 44 and 45

One hundred grams of delta-4 tetrahydrophthalic anhydride and 3 g. of 5% Rh–95% C catalyst were heated for 2 hrs. at 150° C. with stirring. The resulting isomeric mixture contained 14% delta-4; 79% delta-3, and 7% delta-1. This mixture was fortified with 100 grams of delta-4 THPAA to give a mixture containing 56% delta-4; 39% delta-3; and 5% delta-1. About ½ of this fortified mixture was hydrogenated at 30° C. at 45–30 p.s.i.g. with 6 l. of hydrogen. There was obtained 80 g. of a clear ambercolored liquid which upon analysis was found to contain 42% hexahydrophthalic anhydride, 15% delta-4 THPAA, 40% delta-3 THPAA and 3% delta-1 THPAA.

The other half of the fortified mixture was hydrogenated at 30° C. at a pressure of 45–14 p.s.i.g. with 13 liters of hydrogen. There was obtained 111 grams of a clear amber-colored liquid. Analysis showed that is contained 83% hexahydrophthalic anhydride, 11% delta-3 THPAA and 6% delta-1 THPAA.

It is believed that the examples set forth above underscore the capabilities of this invention and the advantages that flow from using a rhodium catalyst for isomerizing tetrahydrophthalic anhydride.

We claim:

1. In an isomerization process for shifting the position of the double bond of tetrahydrophthalic anhydride or an ester thereof in which the isomerization is conducted by contacting the anhydride or ester with between about 0.001% to about 10% by weight of an isomerization catalyst at elevated temperatures in an range of from about 80° C. to about 250° C., the improvement comprising contacting the anhydride or ester with a rhodium catalyst.

2. A process according to Claim 1 including recovering an isomeric mixture which is in the liquid state at about room temperature.

3. A process according to Claim 1 including producing an isomeric mixture having at least 65 wt. percent of the delta-1 isomer and recovering said delta-1 isomer from said mixture.

4. A process according to Claim 3 wherein said isomeric mixture contains about 80 to about 85 wt. percent of the delta-1 isomer.

5. An isomerization process according to Claim 1 wherein the isomerization is conducted at temperatures in a range of from about 125° C. to about 235° C.

6. A process according to Claim 1 wherein said rhodium is supported on alumina.

7. A process for isomerizing the delta-4 isomer of tetrahydrophthalic anhydride comprising forming the delta-4 isomer by reacting 1-3 butadiene and maleic anhydride in the presence of rhodium and thereafter isomerizing the delta-4 isomer in the presence of said rhodium wherein said rhodium is present in a catalytic amount.

8. An isomerization process according to Claim 1 wherein the process is continuous and includes continuously recovering the isomerized product as the anhydride or ester is passed continuously through a catalytic bed of rhodium.

9. An isomerization process according to Claim 1 wherein delta-4 tetrahydrophthalic anhydride is isomerized.

10. An isomerization process according to Claim 9 wherein the product of the isomerization is hydrogenated to convert at least a portion of the product to hexahydrophthalic anhydride.

11. An isomerization process according to Claim 1 wherein the ester is mono or dialkyl and the alkyl groups have from 1 to about 10 carbon atoms.

12. In a process for the isomerization of delta-4 tetrahydrophthalic anhydride in which a shift in the position of the double bond of the anhydride is obtained by heating the anhydride to a temperature in a range of from about 80° C. to about 250° C. and contacting the anhydride while at that temperature with from about 0.001 wt. percent to about 10 wt. percent of a catalyst, the improvement comprising the utilization of rhodium as the catalyst.

13. A process according to Claim 12 wherein the anhydride is heated to a temperature in the range of from about 125° C. to about 235° C.

References Cited
UNITED STATES PATENTS

| | | | |
|---|---|---|---|
| 2,764,597 | 9/1956 | Barney | 260—346.3 |
| 2,959,599 | 11/1960 | Bailey | 260—346.3 |

HENRY R. JILES, Primary Examiner

B. DENTZ, Assistant Examiner

U.S. Cl. X.R.

260—2, 346.6, 468 L